(12) United States Patent
Kobe et al.

(10) Patent No.: US 6,372,323 B1
(45) Date of Patent: Apr. 16, 2002

(54) SLIP CONTROL ARTICLE FOR WET AND DRY APPLICATIONS

(75) Inventors: James J. Kobe, Newport; Leon Levitt, Mendota Heights, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/166,837

(22) Filed: Oct. 5, 1998

(51) Int. Cl.[7] ................................................. B32B 7/00
(52) U.S. Cl. ........................ 428/119; 4/581; 4/582; 4/583; 24/442; 24/452; 24/575; 24/587; 52/177; 428/95; 428/120; 428/122; 428/137; 428/159; 428/160; 428/212; 428/217; 428/218; 428/493; 473/203; 473/300; 473/301; 473/302; 473/303; 473/549; 473/552; 473/568
(58) Field of Search .................. 52/177; 4/583, 4/582, 581; 428/95, 119, 120, 137, 122, 159, 160, 212, 217, 218, 493; 473/302, 301, 300, 303, 203, 549, 568, 552; 24/575, 587, 442, 452

(56) References Cited

U.S. PATENT DOCUMENTS

| 3,266,113 A | 8/1966 | Flanagan, Jr. ............... 24/204 |
| 3,585,101 A | 6/1971 | Stratton et al. ............. 161/116 |
| 4,290,174 A | 9/1981 | Kalleberg ..................... 24/204 |
| 4,488,918 A | 12/1984 | Jofs ............................. 156/79 |
| 4,872,243 A | 10/1989 | Fischer ......................... 24/442 |
| 4,959,265 A | 9/1990 | Wood et al. ................ 428/343 |
| 5,077,870 A | 1/1992 | Melbye et al. ............... 24/452 |
| 5,201,101 A | 4/1993 | Rouser et al. ................ 24/575 |
| 5,234,740 A | 8/1993 | Reeves et al. .............. 428/167 |
| 5,302,440 A | * 4/1994 | Davis .......................... 428/196 |
| 5,491,015 A | * 2/1996 | Reeves et al. .............. 428/167 |
| 5,508,084 A | * 4/1996 | Reeves et al. .............. 428/172 |
| 5,511,248 A | 4/1996 | Widdemer ................... 2/161.3 |
| 5,676,092 A | * 10/1997 | Ortolivo ...................... 119/650 |

FOREIGN PATENT DOCUMENTS

| DE | 32 00 693 A1 | 7/1983 |
| GB | 2 037 536 A | 7/1980 |
| WO | WO 97/27775 | 8/1997 |

* cited by examiner

Primary Examiner—Nasser Ahmad
(74) Attorney, Agent, or Firm—Karl G. Hanson; James L. Young; Karl Schwappach

(57) ABSTRACT

A slip control article including a backing layer having a first surface with an array of at least 100 upstanding stems per square inch and a second surface. At least a portion of the upstanding stems is an elastomeric material and the stems have an aspect ratio of at least 1.25. The first surface has a static coefficient of friction when dry of at least 0.6 and a static coefficient of friction when wet within 20% of the static coefficient of friction when dry. The first surface has a peel strength and a tensile strength of substantially zero when engaged with another slip control article. The first surface has a relatively high shear strength when engaged with another slip control article. The high shear forces are due primarily to the frictional properties of the elastomeric materials, not a mechanical interlock of the stems, such as on a mechanical fastener.

34 Claims, 5 Drawing Sheets

SLIP CONTROL ARTICLE FOR WET AND DRY APPLICATIONS

FIELD OF THE INVENTION

The present invention is directed to a slip control article having a pleasant and soft feel, high friction properties, and good performance in wet and dry conditions.

BACKGROUND OF THE INVENTION

The development of enhanced grip and anti-slip surfaces typically centers around the materials and the surface topology of the article. Common materials include natural and synthetic rubbers, styrenic block co-polymers, latex, ethylene vinyl acetate, ethylene-propylene rubber, polyurethane, polyester co-polymers, polyimides, and the like. The surface topology can range from smooth to having exaggerated gripping structures.

U.S. Pat. No. 3,585,101 discloses a thin sheet of a soft, ductile, flexible material, such as aluminum. brass, plastic or the like, having a knurled pattern embossed to provide an improved gripping surface. The sheet can be applied to solid objects using an adhesive.

U.S. Pat. No. 4,488,918 discloses a plastic film having a non-slip surface comprising spaced, random patterns of rigid peaks and ridges formed of a second thermoplastic material co-extruded with and bonded to a plastic film. The surface has a pattern of relatively high, sharp, irregular plastic peaks and ridges, sufficiently sharp, hard and rough to effect a mechanical gripping with other surfaces.

U.S. Pat. No. 5,234,740 discloses a slip control surface with a structured surface. The structured surface includes an array of protrusions, typically triangular pyramids. The patent discloses that the sheeting may be applied to the handles of athletic equipment such as softball bats, golf clubs, tennis, racquetball, squash, badminton racquets, as well as the handles of tools.

BRIEF SUMMARY OF THE INVENTION

The present invention relates to an improved gripping surface that has a pleasant and soft feel, high frictional properties and good gripping performance in both wet and dry conditions. The gripping surface is a soft microstructured surface having an array of flexible upstanding stems of a variety of shapes produced from a thermoplastic elastomer. The size, spatial distribution, flexibility of the stems, stem array pattern, and the properties of the elastomer material all contribute to the soft feel of the surface, vibration dampening, and the gripping performance under wet and dry conditions. The various embodiments of the present slip control surface may include micro-channels, an absorbent layer and hydrophilic/hydrophobic regions all for directing fluids away from the upstanding stems, leaving them dry and providing high frictional performance even in wet conditions.

The present slip control article may be formed in a sheet structure, such as a wrap that can be applied to another article. Alternatively, the slip control article may be incorporated into a variety of molded or manufactured articles, including sport grips for golf clubs, baseball bats, racquets, bicycle handles, exercise equipment, household articles, construction and surgical tools, non-slip walking surfaces for swimming pool decks, diving boards, bathtubs.

In one embodiment, the slip control article comprises a backing layer having a first surface with an array of at least 15.5 stems/centimeter$^2$ (100 stems per square inch), and more typically at least 54 stems/centimeter$^2$ (350 stems per square inch) and a second surface. At least a portion of an exterior surface of the upstanding stems is an elastomeric material. The stems have an aspect ratio (stem height: stem diameter) of at least 1.25, and preferably at least 1.5, and more preferably at least 2.0 and most preferably greater than 3.0. The first surface has a static coefficient of friction when dry of at least 0.6 and a static coefficient of friction when wet within 20% of the static coefficient of friction when dry. Therefore, frictional properties do not substantially degrade when water is present. The first surface has a peel strength and a tensile strength of substantially zero when engaged with another slip control surface.

In one embodiment, an array of upstanding stems comprising an elastomeric material is also formed on the second surface. The second surface has a static coefficient of friction when dry of at least 0.6 and a static coefficient of friction when wet within 20% of the static coefficient of friction when dry. The second surface has a peel strength and a tensile strength of substantially zero when engaged with another slip control surface.

In other embodiments, the static coefficient of friction when dry is at least 1.0 or at least 2.0. The first surface has a dynamic shear strength of at least 23,268 dynes/centimeter$^2$ (5.4 ounces/inch$^2$), and preferably more than 43,090 dynes/centimeter$^2$ (10 ounces/inch$^2$), and more preferably at least 77,562 dynes/centimeter$^2$ (18 ounces/inch$^2$) and most preferably at least 107,725 dynes/centimeter$^2$ (25 ounces/inch$^2$) when engaged with another slip. control surface at a pressure of about 53 grams/6.45 centimeter$^2$. The high shear forces are due primarily to the frictional properties of the elastomeric materials, not a mechanical interlock of the stems, such as on a mechanical fastener.

The backing layer may be one or more layers, such as a reinforcing web, a foam layer, a substantially inelastic polymeric layer, or an adhesive or foamed adhesive layer, depending on the application of the slip control article. In one embodiment, the backing layer may be. the elastomeric material integrally formed with the upstanding stems. The backing layer may be elastic or inelastic, thick or thin, porous or non-porous, with or without an adhesive layer; etc. In one embodiment, a non-elastomeric backing layer may form a portion of the upstanding stems. Since the backing layer may optionally be extremely thin, the present slip control article may be configured as a very thin wrap or gripping tape suitable for use as lightweight gripping applications. Alternatively, the backing layer may be a portion of a molded, extruded or manufactured article.

In one embodiment, the slip control article for wet and dry conditions comprises a backing layer having a first surface with an array of 100 to 10,000 upstanding stems per square inch, molded at least partially integrally therewith, and a second surface. At least a portion of each Upstanding stem is formed from an elastomeric material having a Shore hardness of less than about 90A, with each stem having a maximum cross sectional dimension of 0.003 to 0.030 inches, and each stem having an aspect ratio of at least 1.25, whereby each stem is highly flexible. The first surface has a static coefficient of friction when dry of at least 0.6 and a static coefficient of friction when wet within 20% of the static coefficient of friction when dry, has a dynamic shear strength of at least 16,805 dynes/centimeter$^2$ when engaged with a stem array of another slip control article having the same defined characteristics, and has a peel strength and a tensile strength of substantially zero when engaged with a stem array of another slip control article having the same defined characteristics.

In one embodiment, the slip control article for wet and dry conditions comprises a backing layer having a first surface with an array of 100 to 10,000 upstanding stems per square inch. molded at least partially integrally therewith, and a second surface. At least a portion of each upstanding stem is formed from an elastomeric material having a Shore hardness of less than about 90A, with each stem having a maximum cross sectional dimension of 0.003 to 0.030 inches, and each stem having an aspect ratio of at last 1.25, whereby each stem is highly flexible. The first surface has a static coefficient of friction when dry of at least 0.6 and a static coefficient of friction when wet within 20% of the static coefficient of friction when dry, has a dynamic shear strength of at least 16,805 dynes/centimeters$^2$ when engaged with a stem array of another slip control article having the same defined characteristics, and has a peel strength and a tensile strength of substantially zero when engaged with a stem array of another slip control article having the same defined characteristics. The slip control article also has micro-channels on at least the first surface thereof.

In one embodiment, the slip control article for wet and dry conditions of the present invention comprises a backing layer having a first surface with an array of 100 to 10,000 upstanding stems per square inch, molded at least partially integrally therewith, and a second surface. At least a portion of each upstanding stem is formed from an elastomeric material having a Shore hardness of less than about 90A, with each stem having a maximum cross sectional dimension of 0.003 to 0.030 inches, and each stem having an aspect ratio of at least 1.25, whereby each stem is highly flexible, and whereby the stems occupy no greater than 24.8% of the total area of the first surface of the backing layer. The first surface has a static coefficient of friction when dry of at least 0.6 and a static coefficient of friction when wet within 20% of the static coefficient of friction when dry, has a dynamic shear strength of at least 16,805 dynes/centimeter$^2$ when engaged with a stem array of another slip control article having the same defined characteristics, and has a peel strength and a tensile strength of substantially zero when engaged with a stem array of another slip control article having the same defined characteristics.

In one embodiment, the slip control article for wet and dry conditions comprises a backing layer having a first surface with an array of at least 1516 upstanding stems per square inch molded at least partially integrally therewith, and a second surface. At least a portion of each stem is formed from an elastomeric material having a Shore hardness of less than about 90A, with each stem having a maximum cross section dimension of 0.003 to 0.030 inches and having an aspect ratio of at least 1.25 so that each stem is highly flexible and the array of elastomeric stems defines a soft and pleasant feel for skin contact. The first surface has a static coefficient of friction when dry of at least 0.6 and a static coefficient of friction when wet within 20% of the static coefficient of friction when dry, has a dynamic shear strength of at least 16,805 dynes/centimeter$^2$ when engaged with a stem array of another slip control article having the same defined characteristics, and has a peel strength and a tensile strength of substantially zero when engaged with a stem array of another slip control article having the same defined characteristics.

In one embodiment: the slip control article for wet and dry conditions comprises a backing layer having a first surface with an array of 100 to 10,000 upstanding stems per square inch molded at least partially integrally therewith, and a second surface. At least a portion of each upstanding stem is formed from an elastomeric material having a Shore hardness of less than about 90A, with each stem having a maximum cross sectional dimension of 0.003 to 0.030 inches so that each stem is highly flexible and the array of elastomeric stems defines a soft and pleasant feel for skin contact. The first surface has a static coefficient of friction when dry of at least 0.6, has an average dynamic shear strength of about 80% of its peak dynamic shear strength when engaged with a stem array of another slip control article having the same defined characteristics, and has a peel strength and a tensile strength of substantially zero when engaged with a stem array of another slip control article having the same defined characteristics.

In one embodiment, the slip control article is a molded grip for wet and dry conditions, the grip comprising a,backing layer having an outer surface with an array of 100 to 10,000 upstanding stems per square inch molded at least partially integrally therewith. At least a portion of each upstanding stem is formed from an elastomeric material having a Shore hardness of less than about 90A, with each stem having a maximum cross sectional dimension of 0.003 to 0.030 inches so that each stem is highly flexible and the array of elastomeric stems defines a soft and pleasant feel for skin contact. The outer surface has a static coefficient of friction when dry of at least 0.6, has an average dynamic shear strength of about 80% of its peak dynamic shear strength when engaged with a stem array on an outer surface of another article having the same defined characteristics, and has a peel strength and a tensile strength of substantially zero when engaged with a stem array on an outer surface of another article having the same defined characteristics.

DETAILED DESCRIPTION OF THE INVENTION

Figure 1:
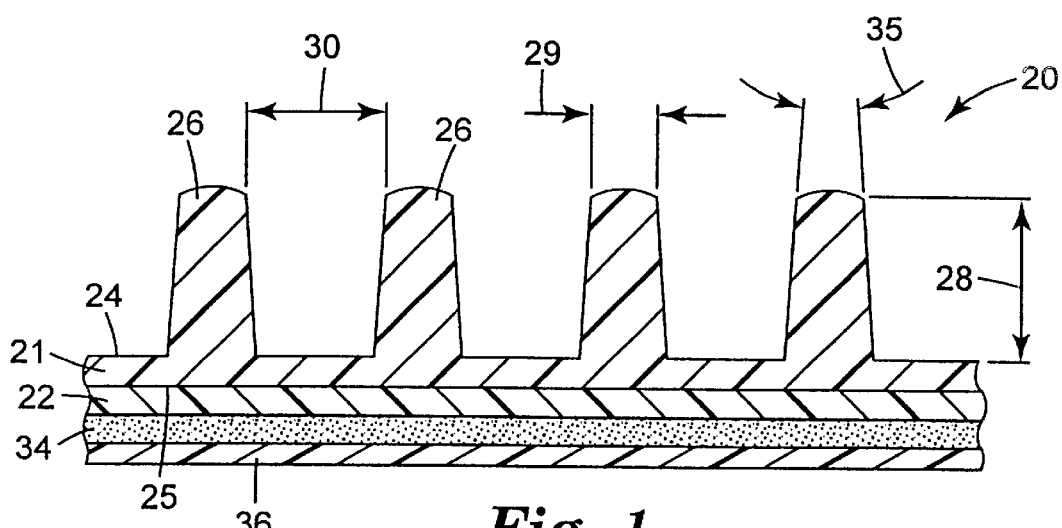
FIG. 1 is a side-sectional view of a slip control article in accordance with the present invention.

FIG. 1 is a side-sectional view of a slip control article 20 in accordance with the present invention. The article 20 includes a backing layer 21 having a first surface 24 with an array of upstanding stems 26. The stems may be arranged in a regular or an irregular array. Various patterns of stems may be used, such as hexagonal, diagonal, sinusoidal, etc. The upstanding stems 26 are constructed of an elastomeric material. The entire exterior surface of the upstanding stems 26 are an elastomeric material. In the embodiment of FIG. 1, the backing layer 21 is integrally formed with the upstanding stems 26 of an elastomeric material. The combination of the backing layer 21 and the upstanding stems 26 is sometimes referred to as a stem web. Although the illustrated embodiments show the stems 26 as being generally cylindrical, the sides of the stems 26 typically have a slight taper 35 to facilitate removal from the mold. A variety of non-cylindrical shapes can also be utilized, such as truncated cones or pyramids, rectangles, hemispheres, squares, hexagon, octagon, gum drops, and the like.

The present slip control article 20 requires primarily upstanding stems 26 constructed of an elastomeric material and a backing layer 21 to hold the structure together. The elastomeric properties of the backing layer 21, however, do not fulfill all requirements for some applications, such as when the slip control article 20 is used as a gripping wrap. Therefore, additional backing layers 22, 34, 36 are optionally applied to the second surface 25 to reinforce the backing layer 21. The additional backing layer 22 may serve to stabilize and reinforce the slip control article 20, to resist stretching and improving tear resistance, as well as a variety of other functions. Adhesive layer 34 and release liner 36 are optionally provided for attaching the present slip control article 20 to another surface. As used herein, backing layer refers to an assembly having one or more layers supporting the upstanding stems, although typically at most one of these layers is integrally formed with the upstanding stems.

The backing layer is typically about 0.05 millimeters to about 0.38 millimeters (0.002 inches to 0.015 inches) thick. In some instances, the backing layer is sufficiently thick to bond a reinforcing web during extrusion, such as a sheet of fabric, to impart increased tear resistance and tensile strength. The reinforcing web is particularly useful when the slip control article is attached to a flexible substrate via sewing. The backing layer may be a foamed or a solid polymeric material. In one embodiment, the backing layer may include a porous and/or absorbent layer, such as layers of fibrous material or fabric scrim which may be woven or nonwoven. A porous material is useful for absorbing moisture and/or directing moisture away from the upstanding stems. In one embodiment, the backing layer includes a substantially inelastic layer to prevent necking or stretching of the slip control article.

It is desirable for the backing layer to be sufficiently compatible with the elastomeric material to keep the slip control article together. Suitable backing layer materials include thermoplastic polyurethanes, polyvinyl chlorides, polyamides, polyimides, polyolefins (e.g., polyethylene and polypropylene), polyesters (e.g., polyethylene terephtlialate), polystyrenes, nylons, acetals, block polymers (e.g., polystyrene materials with elastomeric segments, available from Shell Chemical Company of Houston, Tex., under the designation KRATON™, polycarbonates, thermoplastic elastomers (e.g. polyolefin, polyester or nylon types) and copolymers and blends thereof. The thermoplastic material may also contain additives, including but not limited to fillers, fibers, antistatic agents, lubricants, wetting agents, foaming agents, surfactants, pigments, dyes, coupling agents; plasticizers, suspending agents, hydrophilic/hydrophobic additives, and the like.

The optional adhesive layer typically comprises an adhesive selected to provide a bond to a substrate article to which the slip control surface is to be applied, such as pressure sensitive adhesives, thermosetting or thermoplastic adhesives, radiation cured adhesives, adhesives activated by solvents, and blends thereof The adhesive may include filaments. The backing layer can optionally be laminated or impregnated with the adhesive. One adhesive useful in the present invention is Adhesive Transfer Tape 950 available from Minnesota Mining and Manufacturing Company. Many suitable epoxy, urethane, synthetic or natural based rubber and acrylic adhesives are commercially available for this purpose as well. Depending upon the application, the adhesive may releasably bond or permanently bond the slip control article to a surface.

Figure 1A:
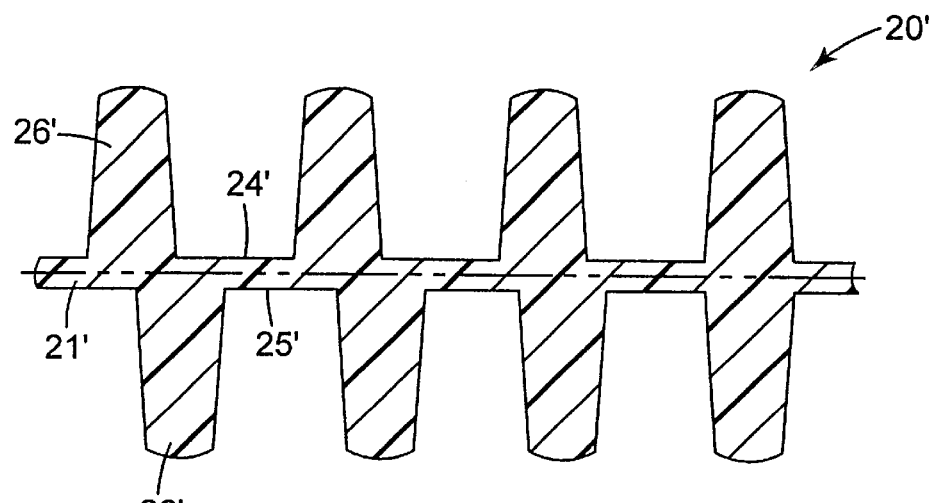
FIG. 1A is a side-sectional view of a two-sided slip control article in accordance with the present invention.

FIG. 1A is a sectional view of a two-sided slip control article 20' as generally illustrated in FIG. 1, without the additional backing layers 22, 34, 36. The article 20' includes a backing layer 21' with an array of upstanding stems 26' on both the first and second surfaces 24', 25'. The upstanding stems 26' are constructed of a single elastomeric material. In the embodiment of FIG. 1A, the backing layer 21' is integrally formed with the upstanding stems 26' of an elastomeric material. In another embodiment, the upper and lower portions may be co-extruded from two different elastomeric materials. A two-side slip control article in accordance with the present invention may be formed from the various disclosed embodiments.

Figure 2:
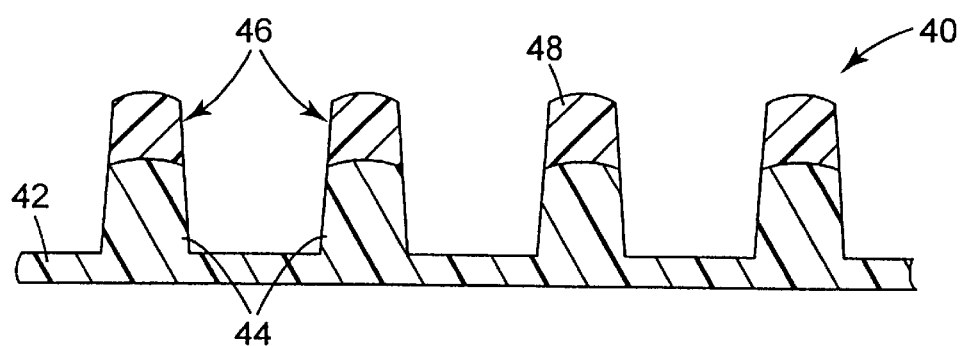
FIG. 2 is a side-sectional view of an alternate slip control article in accordance with the present invention.

FIG. 2 is a side-sectional view of an alternate slip control article 40 in accordance with the present invention. Backing layer 42 defines lower portions 44 of the stems 46. The upper portions 48 of the stems 46 are constructed of the elastomeric material. The backing layer 42 and lower portions of the stems 44 may be constructed of a variety of materials, elastomeric or non-elastomeric, depending upon the application for the slip control article 40. At a minimum, the exterior surface of the upper portions 48 are an elastomeric material. In one embodiment, the upper portions 48 of the stems 44 have hydrophobic properties. Hydrophobic properties may be obtained by constructing the upper portions 48 from a hydrophobic material or treating the upper portions 48 to achieve hydrophobic properties. For applications involving contact with non-polar liquids, the upper portions 48 of the stems 46 may be treated to achieve hydrophilic properties (e.g., corona treatment).

Figure 3:
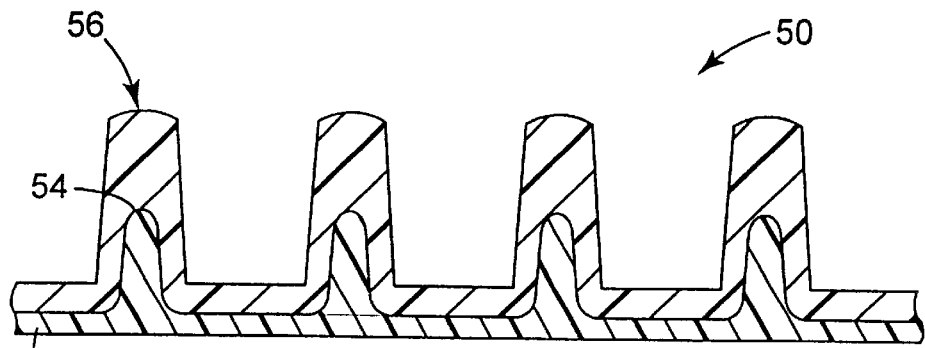
FIG. 3 is a side-sectional view of co-extruded slip control article in accordance with the present invention.

FIG. 3 is a side-sectional view of another alternate slip control article 50 formed by co-extrusion in accordance with the present invention. The backing layer 52 protrudes into a center regions 54 to add structural integrity to the elastomeric stems 56. The backing layer 52 is typically a stiffer polymeric material.

Figure 3A:
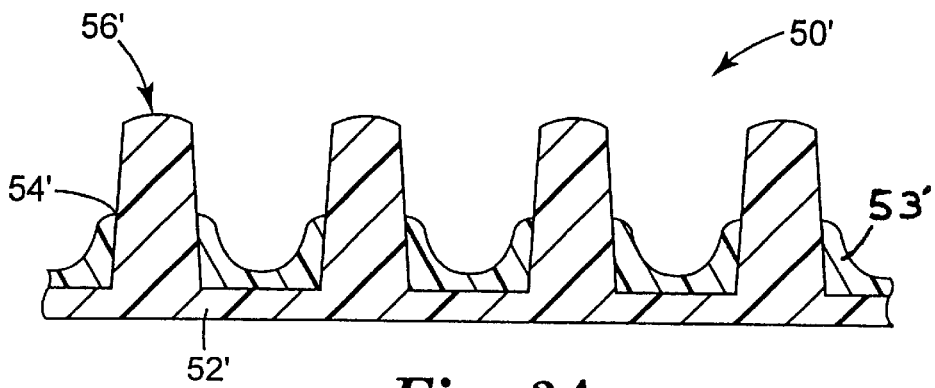
FIG. 3A is a side-sectional view of an alternate co-extruded slip control article in accordance with the present invention.

FIG. 3A is an alternate slip control article 50' formed by co-extrusion in accordance with the present invention. The stems 56' and backing layer 52' are constructed of an elastomeric material. The stems 56' protrude through a center region 54' of an additional backing layer 53'. The additional backing layer 53' may provide structural stability, hydrophobic/hydrophilic properties or a variety of other functions. In one embodiment, the additional backing layer 53' may be an elastomeric material with properties different from those used to construct the stems 56'.

Figure 4:
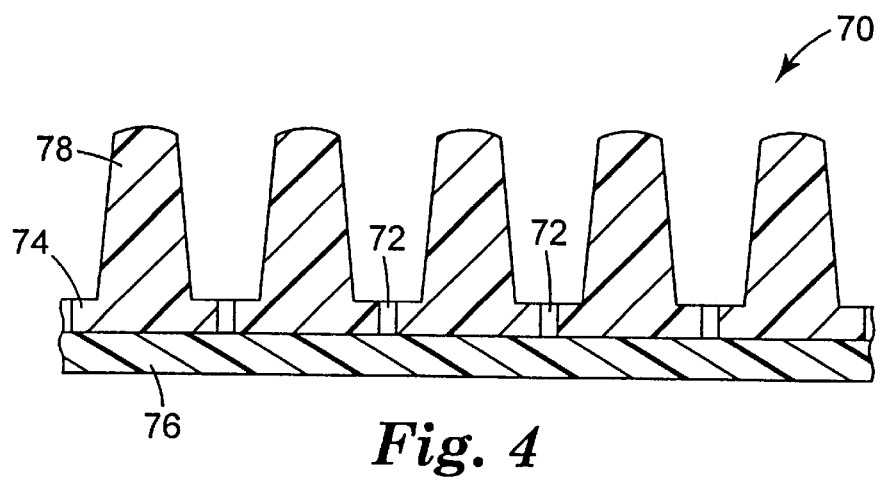
FIG. 4 is a side-sectional view of a slip control article with an absorbent layer on the second surface in accordance with the present invention.

FIG. 4 is a side-sectional view of an slip control article 70 incorporating a plurality of holes 72 through the backing layer 74 in fluid communication with an absorbent layer 76. The absorbent layer 76 draws moisture away from the elastomeric stems 78 to maintain good frictional properties in wet conditions.

Figure 5A:
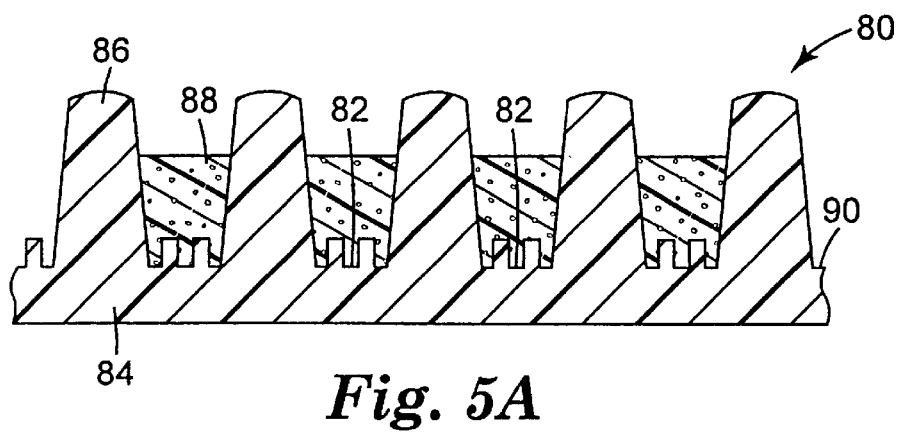
FIG. 5A is a side-sectional view of a slip control article including micro-channels and an absorbent material in accordance with the present invention.
Figure 5B:
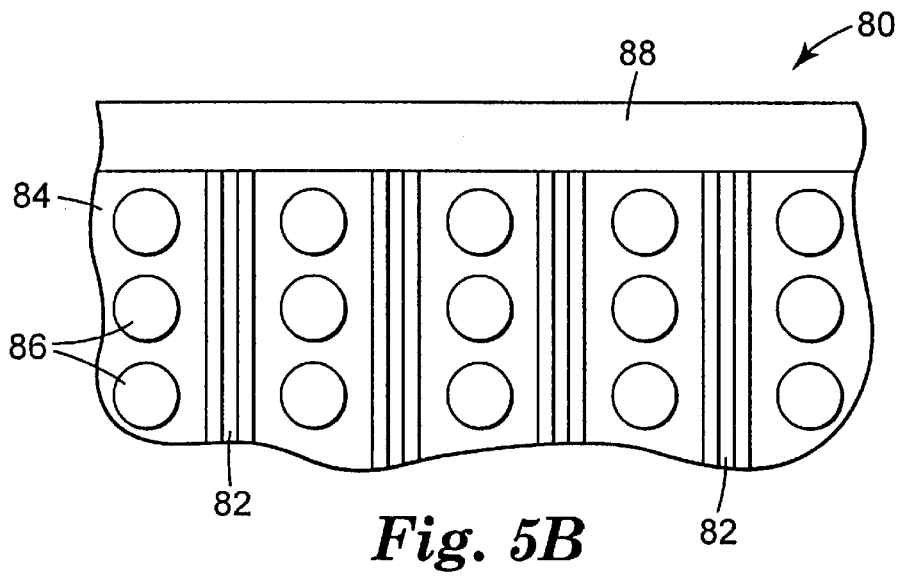
FIG. 5B is a top view of the slip control article of FIG. 5A.

FIGS. 5A and 5B illustrate a slip control article 80 incorporating micro-channels 82 on the backing layer 84 between the upstanding elastomeric stems 86. The micro-channels 82 utilize capillary forces to cause the rapid transport of a fluid in a direction of a driving force. Absorbent layer 88 is located along the first surface 90 of the backing 84 to provide the driving force. Alternatively, the driving force may be gravity and/or hydrophilic areas on the stems 86.

Figure 6:
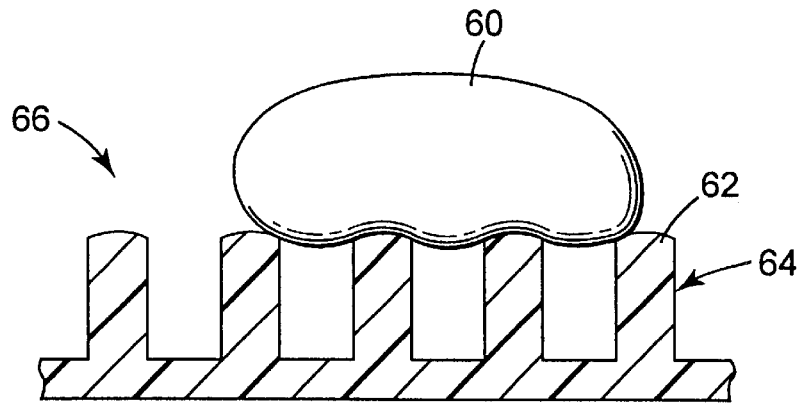
FIG. 6 is a schematic illustration of a water droplet interacting with a slip control article in accordance with the present invention.

A number of mechanisms combine to give the present slip control article exceptional frictional properties in both wet and dry conditions. FIG. 6 is a schematic illustration of an individual water drop 60 residing on hydrophobic tips 62 of the stems 64. The drop 60 is easily removed from the stem 64 by shaking or gripping of the slip control article 66. The redistribution of water is also impacted by stem density.

Figure 7:
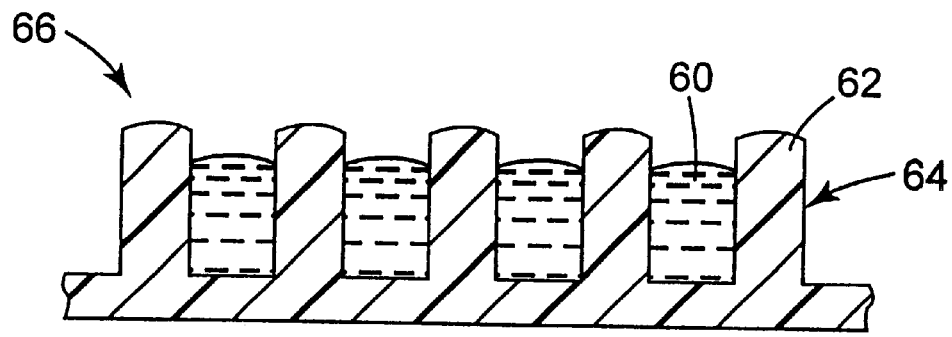
FIG. 7 is a schematic illustration of water being channeled away from the upstanding stems ore a slip control article in accordance with the present invention.

Deposition of large amounts of water 60 results in distribution of the liquid at the base of the stems 64 while the tips 62 remain dry, as illustrated in FIG. 7. When water or any other polar liquid is deposited on the surface of the slip control article 66, the tips 62 of the stems 64 remain exposed due to the hydrophobic nature of the thermoplastic elastomer polymer. Constructing the backing layer from a hydrophilic material assists in directing the water 60 away from the tips 62.

The upstanding stems 64 grip with other surfaces primarily due to the frictional properties of the elastomeric material of the stems. Frictional performance does not require the stems 64 to protrude into the other surface (i.e. mechanical engagement is not required). Therefore, frictional contact can be made with both soft and rigid materials.

The present slip control article provides high shear forces when engaged with another slip control article, at minimal pressure. Since the upstanding stems are constructed substantially from a highly flexible elastomeric material, high shear forces are not derived from a mechanical interlock of the stems, such as on a mechanical fastener. Rather, the frictional properties of the upstanding stems are enhanced by the stem size, stem density, and stem pattern when two slip control articles are engaged with each other. Possible applications include gloves having the present slip control article located for gripping a surface also including the slip control article.

Since the upstanding stems do not interlock, the present slip control article has substantially zero peel; and tensile force when engaged with the same or a similar stem web structure. This feature is important to safe use of the present slip control article for gripping purposes, since the user must typically be free to quickly release the gripped item, without having to overcome any peel or tensile forces generated by the slip control articles. For example, the present slip control article can be wrapped around the handle bars of a bicycle and applied to bicycling gloves. When the user grips the handle bars of the bicycle, the two slip control articles engage to provide excellent slip control properties in shear with minimal pressure. However, the substantially zero peel and tensile forces allows the user to release the handle bars with substantially zero resistance from the two slip control articles.

The soft feel of the present slip control article is due primarily to the nature of the elastomeric material and to stem geometry. The elastomeric material preferably has a Shore hardness of less than about 70D (Estane™ 58091); more preferably less than about 90A, and most preferably less than about 60A. The tensile modulus is preferably less than about 12 MPa, more preferably less than about 6 MPa, and most preferably less than about 4 MPa. Stem height, stem diameter, and spacing between the stems (referred to as stem geometry are significant factors in establishing a soft feel on the surface. Generally, longer stems. result in a softer feel due to their flexibility. As for stem spacing, the average distance between the tactile points in fingertips is approximately 1.27 millimeters (0.050 inches). When the spacing between the objects is less than half the tactile distance, it becomes difficult to distinguish between the protrusions on the surface. Therefore, the best feel is typically obtained for a stem web with the highest available density of stem. A stem density in excess of 310 stems/centimeter$^2$ (2,000 stems per square inch) creates a unique soft and pleasant feel for skin contact.

Referring again to FIG. 1, the stems need to be substantially upstanding to optimize the performance of the slip control article. The stems are kept upstanding by the stem diameter and the nature of the elastomeric material. The upstanding stems typically have a height 28 in the range of about 0.254 millimeters to about 1.27 millimeters (0.010 inches to about 0.050 inches), and more typically in the range of about 0.51 millimeters to about 1.02, millimeters (0.020 inches to 0.040 inches). The separation or gap 30 between adjacent stems 26 is generally in the range of about 0.254 millimeters and about 2.54 millimeters (0.01 inches to about 0.1 inches) and more typically in the range of about 0.46 millimeters to about 0.84 millimeters (0.018 inches to 0.033 inches). The stems 26 have a maximum cross sectional dimension 29 of about 0.076 millimeters to about 0.76 millimeters (0.003 inches to about 0.030 inches). The stems 26 are arranged on the backing in a density of at least 15.5 per centimeter squared (100 per square inch), and more typically about 54 per centimeter squared to about 1550 per centimeter squared (350 per square inch to about 10,000 per square inch).

The stems have an aspect ratio of at least 1.25, and preferably at least 1.5, and more preferably at least 2.0 and most preferably greater than 3.0., although aspect ratios in excess of 3.0 are possible for some applications. Aspect ratio refers to the ratio of pin height to the maximum cross sectional dimension. For pins with a circular cross section, the maximum cross sectional dimension is the pin diameter.

Figure 8:
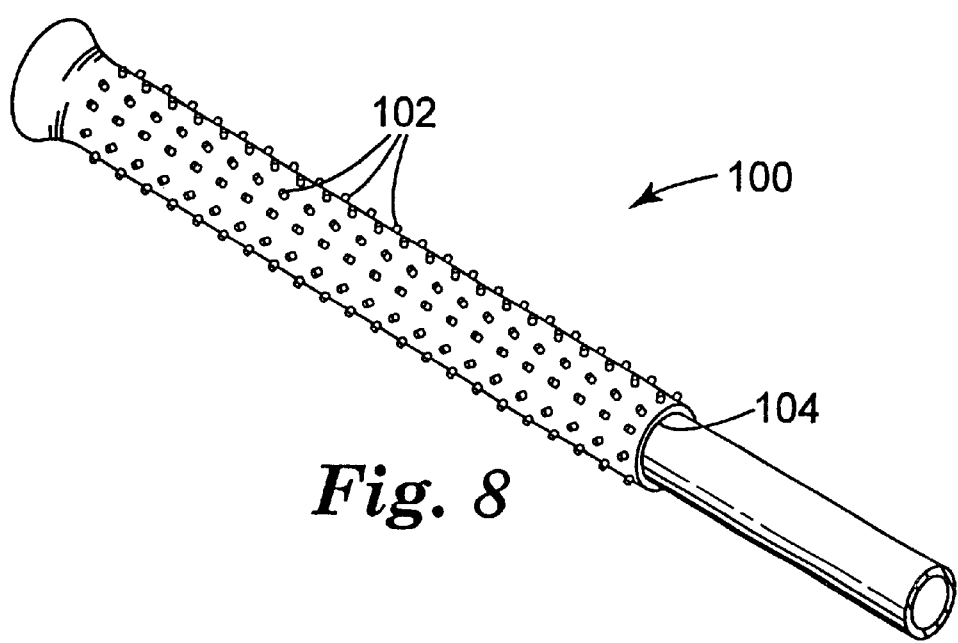
FIG. 8 is, a perspective view of an exemplary article incorporating the slip control article of the present invention.

FIG. 8 is a perspective view of an exemplary article 100 incorporating the slip control surface 102 in accordance with the present invention. The article 100 is a molded grip having an opening 104 at one end, suitable for attachment to a variety of structures such as golf club. baseball bats, handles, and the like. The article 100 may be made using a variety of processes, such as injection molding, profile extrusion, roll extrusion forming, etc.

Elastomeric Materials

The elastomeric material can be any thermoplastic elastomer that can be heated to a state in which it can be flowed and molded, such as those described in G. Holden et al., Thermoplastic Elastomers, ($2^{nd}$ed. 1996). It is also within the scope of this invention to use two or more different thermoplastic elastomeric materials in either layered or blended form to define that portion of the slip control article.

The term "elastomer" or "elastomeric" is used to refer to rubbers or polymers that have resiliency properties similar to those of rubber. In particular, the term elastomer reflects the property of the material that it can undergo a substantial elongation and then return to its original dimensions upon release of the stress elongating the elastomer. In all cases an elastomer must be able to undergo at least 10% elongation (at a thickness of 0.5 mm), and more preferably at least 30% elongation, and return to at least 50% recovery after being held at that elongation for 2 seconds and after being allowed 1 minute relaxation time. More typically, an elastomer can undergo 25% elongation without exceeding its elastic limit. In some cases elastomers can undergo elongation to as much as 300% or more of their original dimensions without tearing or exceeding the elastic limit of the composition. Elastomers are typically defined to reflect this elasticity as in ASTM Designation D883-96 as a macromolecular material that at room temperature returns rapidly to approximately its initial dimensions and shape after substantial deformation by a weak stress and release of the stress. ASTM Designation D412-98A can be an appropriate procedure for; testing rubber properties in tension to evaluate elastomeric properties.

For some applications, thermoset elastomers may be used. Generally, such compositions include relatively high molecular weight compounds which, upon curing, form an integrated network or structure. The curing may be by a variety of methods, including chemical curing: agents, catalysts, and/or irradiation.

The final physical properties of the material are a function of a variety of factors, most notably number and weight average polymer molecular weights; the melting or softening point of the reinforcing domains (hard segment) of the elastomer (which, for example, can be determined according to ASTM Designation D1238-86); the percent by weight of the elastomer composition which comprises the hard segment domains; the structure of the toughening or soft segment (low Tg) portion of the elastomer composition; the cross-link density (average molecular weight between crosslinks); and the nature and levels of additives or adjuvants, etc.

Examples ,of classes of elastomers include anionic triblock copolymers, polyolefin-based thermoplastic elastomers, thermoplastic elastomers based on halogen-containing polyolefins, thermoplastic elastomers based on dynamically vulcanized elastomer-thermoplastic blends, thermoplastic polyether ester or polyester based elastomers, thermoplastic elastomers based on polyamides or polyimides, ionomeric thermoplastic elastomers, hydrogenated block copolymers in thermoplastic elastomer interpenetrating polymer networks, thermoplastic elastomers by carbocationic polymerization, polymer blends containing styrene/hydrogenated butadiene block copolymers, and polyacrylate-based thermoplastic elastomers. Some specific examples of elastomers are natural rubber, butyl rubber, EPDM rubber, silicone rubber such as polydimethyl siloxane, polyisoprene, polybutadiene, polyurethane, ethylene/propylene/diene terpolymer elastomers, chloroprene rubber, styrene-butadiene copolymers (random or block), styrene-isoprene copolymers (random or block), acrylonitrile-butadiene copolymers, mixtures thereof and copolymers thereof. The block copolymers may be linear, radial or star configurations and may be diblock (AB) or triblock (ABA) copolymers mixtures thereof. Blends of these elastomers with each other or with modifying non-elastomers are also contemplated. Commercially available elastomers include block polymers (e.g., polystyrene materials with elastomeric segments), available from Shell Chemical Company of Houston, Tex., under the designation KRATON™.

Method of Manufacture

Figure 9:
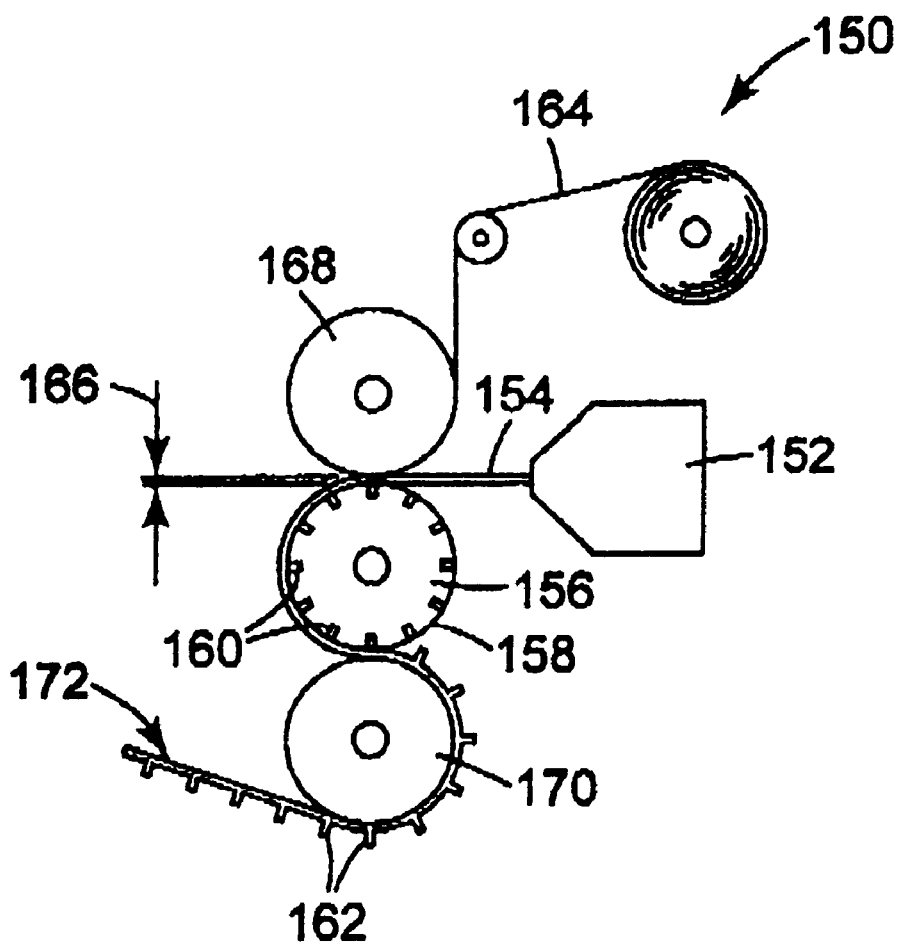
FIG. 9 is a schematic illustration of an exemplary method of manufacturing the slip control article in accordance with the present invention.

The process illustrated in FIG. 9 shows a three-roll vertical stack molding apparatus 150 which includes an extruder and extrusion die 152 adapted for extruding one or more layers of molten thermoplastic material 154 into a mold 156. In this case, the mold 156 is a roll 158, which has on its outer cylindrical surface a desired surface pattern for transference to the molten thermoplastic material 154 as it passes over the cylindrical surface of the roll 158. In the illustrated embodiment, the surface of the roll 158 has a plurality of arranged cavities 160 adapted to form a like plurality of upstanding stems 162. The cavities may be arranged, sized and shaped as required to form a suitable surface stem structures from the thermoplastic material 154. In one embodiment, a sufficient additional quantity of molten thermoplastic material 154 is extruded into the mold 156 to form a portion of the backing layer (see FIGS. 1 and 3).

The roll 158 is rotatable and forms a nip 166, along with an opposed roll 168. The nip 166 between the roll 158 and opposed roll 168 assists in forcing the flow of molten thermoplastic material 154 into the cavities 160 and provides a uniform backing layer thereon. The spacing of the gap forming the nip 166 can be adjusted to assist the formation of a predetermined thickness of the backing layer of thermoplastic material 154. Optionally, backing layer ;1 64 is simultaneously brought into the nip 166. Depending upon the composition of the elastomeric material and the geometry of the upstanding stems 162, the backing layer 164 may be useful in efficiently removing the slip control article 172 from the mold 156.

As illustrated in FIG. 9, the slip control article 172 may traverse a third roll 170 after exiting the roll 158. In this process, the temperatures of all three rolls 158, 168, 170 may be selectively controlled to achieve desired cooling of the thermoplastic material 154. The third roll 170 also serves to define the further path traversed by the slip control article 172.

The mold 158 may be of the type used for either continuous processing (such as a tape, a cylindrical drum or a belt), or batch processing (such as an injection mold or a compression mold). When making a mold 158 for forming the upstanding stems 162, the cavities 160 of the mold 158 may be formed in any suitable manner, such as by drilling, machining, laser drilling, water jet machining, casting, etching, die punching, diamond turning, engraving knurling and the like. The placement of the cavities determines the spacing and orientation of the slip control article. The stems 162 typically have shapes corresponding to the shape of the cavities 160. The mold cavities can be open at the end of the cavity opposite the surface from which the molten thermoplastic material is applied to facilitate injection of the thermoplastic material into the cavity. If the cavity is closed, a vacuum can be applied to the cavity so that the molten thermoplastic material fills substantially the entire cavity. Alternatively, closed cavities can be longer than the lengths of the stem structures being formed so that the injected material can compress the air in the cavities. The mold cavities should be designed to facilitate release of the surface stem structures therefrom, and thus may include angled side walls, or a release coating (such as a Teflon material layer) on the cavity walls. The mold surface may also include a release coating thereon to facilitate release of the thermoplastic material backing layer from the mold. In some embodiments, the cavities can be angled relative to the surface of the roll.

The mold can be made from suitable materials that are rigid or flexible. The mold components can be made of metal, steel, ceramic, polymeric materials (including both thermosetting aid thermoplastic polymers such as silicone rubber) or combinations thereof. The materials forming the mold must have sufficient integrity and durability to withstand the thermal energy associated with the particular flowable thermoplastic material used to form the backing layer and surface topographies. In addition, the material forming the mold preferably allows the cavities to be formed by various methods, is inexpensive, has a long service life, consistently produces material of acceptable quality, and allows for variations in processing parameters.

The molten thermoplastic material is flowed into the mold cavity, and over the surface of the mold to form the layer of cover material. To facilitate flow of the molten thermoplastic material, the thermoplastic material typically must be heated to an appropriate temperature, and then coated into the cavities. This coating technique can be any conventional technique, such as calendar coating, cast coating, curtain coating, die coating, extrusion, gravure coating, knife coating, spray coating or the like. In FIG. 9, a single extruder and extrusion die arrangement is shown. However, the use of two (or more) extruders and associated dies allows simultaneous extrusion into the nip 166 of a plurality of thermoplastic materials to achieve a multi-component (layered or blended) laminate cover material.

The flow of the molten thermoplastic material 154 into the mold, 158 may also be facilitated by the application of pressure between opposing rolls 158 and 168. When the backing layer 164 Includes a porous material, the three-roll vertical molding apparatus 150 controls the degree of penetration of the molten thermoplastic material 154. In this fashion, the quantity of molten thermoplastic material 154 can be controlled to barely penetrate the surface coating of the backing layer 164, or penetrate the porous backing layer 164 on the opposite side of introduction of thermoplastic material 154 so as to almost encapsulate the backing layer 164. The penetration of the molten thermoplastic material 154 into the porous backing layer 164 may also be controlled by the temperature of the molten thermoplastic material 154, the quantity of thermoplastic material 154 in the nip 166, and/or by extruder flow rates in conjunction with the line speed of the mold cavities.

After the molten thermoplastic material 154 has been coated into the mold cavities 160 and over the mold surface 156, the thermoplastic material is cooled to solidify and form the desired exterior surface topography thereon (e.g., upstanding stems 162). The solidified thermoplastic material is then separated from the mold 158. The thermoplastic material 154 will often shrink when it is solidified, which facilitates release of the material (e.g., surface stem structures and backing layer) and integral film layer from the mold (see FIG. 1). Part or all of the mold may be cooled to aid in solidifying the surface stem structures and backing layer. Cooling can be effected by the use of water, forced air, heat transfer liquids or other cooling processes.

Some molding processes, such as injection molding, may utilize thermoset elastomeric polymers. When thermosetting resins are used as the molten material, the resin is applied to the mold as a liquid in an uncured or unpolymerized state. After the resin has been coated onto the mold, it is polymerized or cured until the resin is solid. Generally, the polymerization process involves either a setting time, or exposure to an energy source, or both to facilitate the polymerization. The energy source, if provided, can be heat or radiation energy such as an electron beam, ultraviolet light or visible light. After the resin is solidified, it is removed from the mold. In some instances, it may be desired to further polymerize or cure the thermosetting resin after the surface stem structures are removed from the mold. Examples of suitable thermosetting resins include melamine, formaldehyde resins, acrylate resins, epoxy resins, urethane resins and the like. The formation of a backing layer having upstanding stem structures on at least one side thereof can be performed by injection molding or profile extrusion, such as is disclosed in U.S. Pat. Nos. 4,290,174 (Kalleberg); U.S. Pat. No 5,077,870 (Melbye et al.); and U.S. Pat. No 5,201,101 (Rouser et al.).

Test Procedure for Measuring Static and Dynamic Coefficients of Friction

The static and dynamic coefficient of friction for each film sample was measured on a Thwing-Albert Model 225-1 Friction/Peel Tester available from Thwing-Albert Instrument Company, Philadelphia, Pa. Equipment operation is specified in the Thwing-Albert Instruction Manual, Friction/Peel Tester, Model #225-1 revised 5/94, Software version 2.4. This analysis for the static coefficient of friction measured the horizontal force required to cause movement of a weighted 5.08 cm by 5.08 cm (2 inch by 2 inch) sample of the slip control article against a sample of artificial leather sold under the name Ultrasuede™ HP available from Toray Ultrasuede America located in Manhattan, N.Y.

The friction test specimen were prepared by anchoring a 5.08 cm by 5.08 cm (2 inch by 2 inch) sample of the slip control article to a 5.08 cm by 5.08 cm (2 inch by 2 inch) metal test sled. The test specimen were attached to the sold with a two sided pressure sensitive adhesive such as SCOTCH 9851, available from Minnesota Mining and Manufacturing Company, St. Paul, Minn. The metal test sled weighed grams.

To prepare the artificial leather sample for the friction test a sample approximately 10.16 cm by 30.48 cm (4 inches by 12 inches) was anchored to a metal sheet with a two sided pressure sensitive adhesive tape, such as SCOTCH 9851 to prevent movement and wrinkling of the sample during the test.

The metal sheet with the sample adhered was clamped on to the metal platen testing surface with the provided spring clip. The metal test sled with film sample on bottom of the sled weighing 200 grams in total was placed on the fabric and pulled for 10 seconds at a speed of 5.1 cm (2 inches) per minute across the fabric per instructions specified in the instructions manual. The static coefficient of friction was then calculated by the machine wherein the measured horizontal force to cause slippage on the .ample was divided by the 200 gram normal force of the sled. At least five measurements were recorded for each friction test sample and slip control article. Arithmetic averages were calculated by the friction/peel tester.

Test Method for Dynamic Shear Strength

The dynamic shear strength was measured on an I-mass peel tester. The tester was set up in the 180° Peel Mode. A sample about 3.8 cm×12.7 cm (1.5 inches×5 inches) of stem web was attached using a double sided tape, such as 3M 404, and centered lengthwise to an about 1.6 mm (¹⁄₁₆ inch) thick, 6.35 cm×22.9 cm (2.5 inches wide×9 inches long) aluminum test panel. Similarly, a sample about 2.54 cm×2.54 cm (1 inch×1 inch) of an stem web was attached to the center of about 1.6 mm (¹⁄₁₆ inch) thick, 6.35 cm×22.9 cm (2.5 inches wide×9 inches long) aluminum test panel. The panels were then placed together with the stems of each sample in contact with each other. The engaged thickness of the two samples without any pressure applied including the aluminum panels was measure using a digital caliper gauge. The weight of the upper panel was approximately 53 grams.

An aluminum panel with the larger sample of stem web was attached to the moving platform of the I-mass tester with the stem web side up. The aluminum panel with the sample about 2.54 cm×2.54 cm (1 inch×1 inch) of stem web was placed on top so that the stem webs were in an engaged position. The stem web was positioned so that it was at the end farthest away from the force gauge so that the sample on the upper panel would be pulled through the lower sample. A bar was placed over the engaged pair with a gap approximately 0.13 mm–0.254 mm (0.005–0.010 inches) greater than the engaged thickness. This bar is designed to prevent the samples from disengaging without exerting undue pressure to engage. the two stem web samples. The end of the upper aluminum panel was attached to the force gauge in a position so that the gauge would measure a force directly parallel to the moving platform.

The I-mass tester was balanced, zeroed and adjusted to measure a 2 second averaging time. The position of the spacing bar was adjusted so that it would be directly above the stem web sample during the 2 second averaging time. The platform rate was set at 30.5 cm/minute (12 inches/minute). The peak, valley, and average forces were measure for each sample. Each sample was tested three times and the average values were calculated.

Materials Used in the Examples

A variety of elastomeric materials were used in the preparation of the samples of the examples. These materials are summarized in Table 1. Some properties of some of the samples are summarized in Table 2.

TABLE I

| Material | Description |
|---|---|
| ESTANE ™ 58661 | available from B.F. Goodrich, Cleveland, OH |
| ESTANE ™ 58238 | available from B.F. Goodrich, Cleveland, OH |
| VECTOR ™ 4111 | available from Exxon Chemical Co., Houston, TX |
| ESTANE ™ 5740-820 | available from B.F. Goodrich, Cleveland, OH |
| KRATON ™ G1657 | available from Shell Oil Co., Houston, TX |

TABLE 2

| Material | Modulus @ 100%, MPa | Ultimate elongation | Tensile set 200% elongation | Friction Coef. | Tensile strength MPa | Hardness, Shore A |
|---|---|---|---|---|---|---|
| Polyurethane Estane ™ 58238 | 4.5 | 680% | 3% | 1.35 | 48.3 | 75 |
| Polyurethane Estane ™ 58661 | 5.86 | 640% | 3% | 1.4 | 52.4 | 80 |
| Polyurethane Estane ™ 5740 × 820 | 3.8 | 750% | 5.6% | 1.5 | 24.9 | 79 |
| Vector ™ 4111 | 1.9 | 1200% | 15% | 2.55 | 29 | 38 |
| Kraton ™ G1657 | 2.4 | 750% | 10% | 2.1 | 23.4 | 65 |
| MPR Alcryn ™ 2080-BK | 6.45 | 280% | 8% | .9–2.6 | 13 | 77 |

Rheology and Morphology of the Blends

Viscosities of both Estate™ 58661 and Vector™ 4111 were measured over several decades of shear rate using both a DSR and a capillary rheometer (CR) at 204° C. (400° F.), the temperature used in the stem web extrusion. It is apparent that at higher shear rates (>10 s-1), the viscosity and elasticity modulus of Vector™ 4111 are approximately twice that of Estane™ 58661.

Scanning electron microscopy (SEM) was used to investigate the morphology of blends of various compositions. The blends were mixed using a Brabender mixer and pressed into a silicone mold using a hot press method at about 216° C. (420° F.) at 6.9 MPa (1000 psi) for 60 seconds. The tool containing the material was cooled on dry ice. The sample was peeled from the mold. Only hot-pressed blends, described below, were studied. Micrographs were taken near the sample surface. A dispersed morphology was present in nearly every sample. Only in the 60/40 Estane™ 58661/Vector™ 4111 sample were any co-continuous structures present.

EXAMPLES

Example 1

A 50:50 by weight of polyurethane resin Estane™ 58661 and a styrenic triblock copolymer Vector™ 4111 was dry blended as pellets. Polyurethane provided durability and resiliency of the structure while Vector improved frictional performance. The Estane™ 58661 was dried at about 82.3° C. (180° F.) for at least 4 hours. The mixture of pellets was mixed with about 2 wt % of carbon black/polyurethane blend. The content of carbon black in the final blend did not exceed 1 wt %.

The mixture was extruded as generally illustrated in FIG. 9, except that the tooling was configured as a belt rather than a roll. The extruder as a Davis Standard single screw extruder with about 6.35 cm (2.5 inches) screw diameter designed for polyolefin processing. At about 8 revolutions per minute (rpm), the melt was discharged through the die at melt pressure of about 13.8 MPa (2000 psi). The temperature in the last zone of the extruder was about 216° C. (420° F.). The temperature of the die was about 232° C. (450° F.). The opening of the die lip was about 0.51 millimeters (0.020 inches).

The melt was pressed into a silicone belt/tool with a metal roll at a nip pressure of about 345,705 Pa (50 psi). One of the rolls had a tooled surface that was heated to about 65.6° C. (150° F.) The surface contained an array of holes about 0.254 mm (0.010 inches) in diameter and about 0.46 cm (0.018 inches) apart. A backing layer of double coated tape available from Minnesota Mining and Manufacturing Company under product designation 404 was introduced into the nip and bonded to the side of the web opposite the upstanding stems. The web and double coated tape was removed from the tooled surface at a speed of about 1.5 meters/minute (5 feet per minute).

The resulting stem web had about 490 stems/centimeters$^2$ (3159 stems per square inch). The center-to-center spacing of the stems was about 0.439 mm (0.0173 inches) in the x-direction and about 0.465 mm (0.0183 inches) in the y-direction. Stem diameter was about 0.15 mm (0.0059 inches) and the stem height was about 0.625 mm (0.0246 inches). The gap between adjacent stems was about 0.127 mm (0.005 inches). Using the size of the tool diameter holes (0.010 inches) to define the largest possible individual stem cross-sectional area (0.00007854 inches$^2$), the area of each square inch of the stem web made up of stems (at about 3159 stems/inch$^2$) is thus no greater than about 24.8% of the total area.

Wetting capability of water was estimated by measuring a contact angle between a drop of water and flat substrate with the same composition as the stem web. The contact angle was measured to be about 65°, which was expected for a hydrophobic material (see generally FIG. 6). A large amount of water was then applied to the structured surface of the stem web and viewed in optical microscope. Water completely filled the space between the stems. The tips of the stems were exposed due to hydrophobic nature of the elastomer, as shown in FIG. 7. As a result of the exposed tips, frictional properties were improved when compared to flat sheet performance, when tested under the same conditions.

The gripping performance was evaluated using two approaches. The first set of experiments included direct measurements of the frictional properties of the stem web. The results were compared to the performance of the flat substrate made of the same polymer blend as the stem web. The second approach involved direct application of the stem web to an article. A 68.6 cm×2.54 cm (27 inches×1 inch) strip of the web was wrapped around a golf shaft and compared to the existing golf grips performance in both wet and dry conditions. A panel of evaluators took a series of swings with the golf club with the new grip. The performance of the invention was believed to be superior to the control sample in wet conditions. A similar test was conducted with a tennis racket.

Example 2

For more consistent removal of the stem web from the tooled surface and uniform application the articles, a two-layer construction was created using a co-extrusion process. The tooling and processing parameters were as described in Example 1 unless otherwise specified. Rather than the backing layer of the double coated tape in Example 1, a backing layer made of a 80:20 wt % blend of polyurethane Estane™ 58137 and Vector™ 4111 was co-extruded with the stem web. The polyurethane had hardness of 70 Durometer and the modulus of about 22 MPa (3200 psi). The stiffer backing layer was extruded using about 6.35 cm (2.5 inches) diameter screw at about 5 rpm. The top layer which formed the stemmed portion of the construction was extruded using about a 3.2 cm (1.25 inches) diameter screw extruder operating at about 15 rpm. The temperature profile was the same as described in Example 1. The polymer melt was discharged at a minimum pressure of about 6.9 MPa (1000 psi) and at the temperature in the front zone of about 216° C. (420° F.)

Both melts were combined in Cloeren feed block model no. 86-120-398 at about 232° C. (450° F.). A Cloeren extrusion die with a deckle system, model no. 89-12939, was used. The construction was removed from the tooled surface at about 1.5 meters/minute and about 3 meters/minute (5 fpm and 10 fpm). The resulting thickness of the each layer (not including the stems), at about 5 fpm take-up speed was about 0.254 mm (0.010 inches).

Example 3

A stem web was made generally according to Example 2 using a tool with different stem geometry and a pressure of about 68,941 Pa (10 psi), resulting in shorter stems. The stem web was a 80:20 by weight of polyurethane resin Estane™ 58661 and a styrenic triblock copolymer Vector™ 4111. The backing layer was made of a 80:20 wt % blend of polyurethane Estane™ 58137 and Vector™ 4111, co-extruded with the stem web as in Example 2.

The resulting stem web had about 235 stems/centimeters$^2$ (1516 stems per square inch). The center-to-center spacing of the stems was about 0.676 mm (0.0266 inches) in the x-direction and about 0.630 mm (0.0248 inches) in the y-direction. Stem diameter was about 0.198 mm (0.0078 inches) and the stem height was about 0.307 mm (0.0121 inches). The gap between adjacent stems was about 0.127 mm (0.005 inches). Using the size of the tool diameter holes (0.010 inches) to defined the largest possible individual stem cross-sectional area (0.00007854 inch$^2$), the area of each square inch of the stem web made up of stems (at about 1516 stems/inch$^2$) is thus no greater than about 11.90% of the total area.

Example 4

A stem web with a single layer construction and a density of about 139 stems/cm$^2$ (900 stems/square inch) was created using a tool with different stem geometry and the same processing conditions and polymer blend formulation as in Example 1. The stems had about 50% larger diameter than the stems on the about 465 stems/cm$^2$ (3000 stems/square inch) construction of Example 1, which lead to better durability of the construction. Stem height was about 0.56 mm to about 0.61 mm (0.022 inches to 0.024 inches). At a distance between the pins of about 0.84 mm (0.033 inches), individual pins could be felt. Thicker pins are also less flexible, which also contributed to a more rough, or coarse feel of the surface. This surface is most suited for non-skin contact applications. Using the size of the tool diameter holes (0.010 inches) to defined the largest possible individual stem cross-sectional area (0.00007854 inch$^2$), the area of each square inch of the stem web made up of stems (at about 900 stems/inch$^2$) is thus no greater than about 7.1% of the total area.

Example 5

A stem web was made using a tool with different stem geometry and substantially according to Example 1 with a 80:20 by weight of polyurethane resin Estane™ 58661 and a styrenic triblock copolymer Vector™ 4111. The resulting stem web had about 46 stems/centimeters$^2$ (299 stems per square inch). The center-to-center spacing of the stems was about 1.68 mm (0.066 inches) in the x-direction and about 1.29 mm (0.0507 inches) in the y-direction. Stem diameter was about 0.459 mm (0.0195 inches) and the stem height was about 0.617 mm (0.0243 inches). The gap between adjacent stems was about 0.254 mm (0.010 inches). The higher percentage of polyurethane increased durability of the resulting slip control article. Using the size of the tool diameter holes (0.020 inches) to defined the largest possible individual stem cross-sectional area (0.00031416 inch$^2$), the area of each square inch of the stem web made up of stems (at about 299 stems/inch$^2$) is thus no greater than about 8.9% of the total area.

Example 6

Stem web sheets were made using silicone tooling similar to Example 1 and the hot press method discussed above. The formulations are set forth in Table 3, where the ratios refer to percentage of Estane™ 58661 to Vector™ 4111. The resulting stem web had about 490 stems/centimeters$^2$ (3159 stems per square inch). The center-to-center spacing of the stems was about 0.439 mm (0.0173 inches) in the x-direction and about 0.465 mm (0.0183 inches) in the y-direction. Stem diameter was about 0.15 mm (0.0059 inches) and the stem height was about 0.625 mm (0.0246 inches). The gap between adjacent stems was about 0.127 mm (0.005 inches).

In order to quantitatively compare the group properties of various blend compositions in both wet and dry conditions, a Thwing-Alber friction/peel tester was used to measure both static (SFC) and dynamic (DFC) friction. In addition, friction coefficients for flat sheets, i.e. the other side of the stem web, were also measured for a few of the blend compositions. The average SFC and DFC values for stem webs prepared in a batch process using a heated press of various formulations are given in Table 3.

TABLE 3

Frictional properties of blended stem webs in dry and wet conditions.

| Formulation | SFC Dry | DFC Dry | SFC Wet | DFC Wet |
|---|---|---|---|---|
| Estane 58661 | 1.3 | 1.25 | 1.2 | 1.1 |
| 80/20 | 1.5 | 1.5 | 1.4 | 1.4 |
| 60/40 | 1.8 | 1.75 | 1.7 | 1.6 |
| 50/50 | 1.85 | 1.75 | 1.7 | 1.6 |
| 40/60 | 2.1 | 2.0 | 2.0 | 1.9 |
| 20/80 | 2.3 | 2.11 | 2.1 | 1.8 |
| Vector 4111 | 2.5 | 2.3 | 2.3 | 2.1 |

Stem samples made from pure Vector™ 4111 have the highest DFC and SFC, and pure Estane™ 58661 stem samples have the lowest DFC and SFC. Mixtures are somewhere in between with a nearly linear relationship. In addition, SFC and DFC for each blend decreases with the addition of water between the stems and the Ultrasuede™ substrate. In fact, the addition of water causes an only about a 7% decrease in stem web friction for every blend composition. Small differences in friction performance are found for 50/50 and 60/40 blends. Based on frictional performance, the 60/40 formulations will lead to better wear properties since it possess a larger volume fraction of polyurethane.

Example 7

A stem web of 50:50 by weight of polyurethane resin Estane™ 58661 and a styrenic triblock copolymer Vector™ 411 was made according to Example 1. The stem geometry is as set forth in Example 1. A flat sheet was also made using this formulation. The average SFC and DFC values for stem web and the flat sheet are given in Table 4.

TABLE 4

Stem web and flat film comparison.

| Sample ID | SFC Dry | DFC Dry | SFC Wet | DFC Wet |
|---|---|---|---|---|
| Flat Film | 2.12 | 2.08 | 1.3 | 1.3 |
| Stem web | 2.1 | 2.0 | 2.05 | 1.95 |

From Table 4 it is evident that both static and dynamic coefficients of friction are comparable for the stem web (60% Estane™ 58661 and 40% Vector™ 4111) and flat sheet when measured in dry conditions. However, when some water was added to the stem web, coefficient of friction of the flat sheet decreased by 30%, while stem web maintained its high friction, within the experimental error. This result is consistent with the mechanism of wetting described on FIGS. 6 and 7.

Example 8

Three samples of the stem webs of Examples 1, 3 and 5 were examined for dynamic shear strength using the test method described above. A summary of the results is found in Table 5.

TABLE 5

Dynamic Shear Strength - Dynes/cm$^2$ (ounces/inch$^2$)

| Example | Sample | Peak | Valley | Average |
|---|---|---|---|---|
| 1 | 1 | 168,481 | 140,904 | 157,709 |
|   |   | (39.1 oz/sq. in.) | (32.7 oz/sq. in.) | (36.6 oz/sq. in.) |
| 1 | 2 | 144,351 | 140,904 | 143,489 |
|   |   | (33.5 oz/sq. in.) | (32.7 oz/sq. in.) | (33.3 oz/sq. in.) |
| 1 | 3 | 202,523 | 81,009 | 436,595 |
|   |   | (47.0 oz/sq. in.) | (18.8 oz/sq. in.) | (31.7 oz/sq. in.) |
| 1 | Average | 171,929 | 121,082 | 146,075 |
|   |   | (39.9 oz/sq. in.) | (28.1 oz/sq. in.) | (33.9 oz/sq. in.) |
| 3 | 1 | 18,959 | 14,650 | 16,805 |
|   |   | (4.4 oz/sq. in.) | (3.4 oz/sq. in.) | (3.9 oz/sq. in.) |
| 3 | 2 | 23,268 | 18,959 | 21,545 |
|   |   | (5.4 oz/sq. in.) | (4.4 oz/sq. in.) | (5.0 oz/sq. in) |
| 3 | 3 | 35,333 | 21,114 | 31,886 |
|   |   | (8.2 oz/sq. in.) | (4.9 oz/sq. in.) | (7.4 oz/sq. in.) |
| 3 | Average | 25,854 | 18,097 | 23,268 |
|   |   | (6.0 oz/sq. in.) | (4.2 oz/sq. in.) | (5.4 oz/sq. in.) |
| 5 | 1 | 168,051 | 107,725 | 133,148 |
|   |   | (39.0 oz/sq. in.) | (25.0 oz/sq. in.) | (30.9 oz/sq. in.) |
| 5 | 2 | 152,969 | 80,578 | 135,733 |
|   |   | (35.5 oz/sq. in.) | (18.7 oz/sq. in.) | (31.5 oz/sq. in.) |
| 5 | 3 | 152,538 | 81,009 | 112,034 |
|   |   | (35.4 oz/sq. in.) | (18.8 oz/sq. in.) | (26.0 oz/sq. in.) |
| 5 | Average | 157,709 | 89,627 | 127,115 |
|   |   | (36.6 oz/sq. in.) | (20.8 oz/sq. in.) | (29.5 oz/sq. in.) |

The stem webs made according to Examples 1 and 5 had the best dynamic shear strength. The samples from Examples 1 and 3 were more similar in stem density and stem diameter than those of Example 5. However, the stem height of the samples of Example 3 was approximately half the height of the stems of Examples 1 and 5. Even the relatively low density stem web of Example 5 outperformed the samples of Example 3. Therefore, stem height appears to be a significant factor in dynamic shear strength.

For the "Average" sample of Example 1, the average dynamic shear strength is about 85% of the peak dynamic shear strength (146,075÷171,929=0.8554). For the "Average" sample of Example 3, the average dynamic shear strength is about 90% of the peak dynamic shear strength (31,866÷35,333=0.9019). For the "Average" sample of Example 5, the average dynamic shear strength is about 80% of the peak dynamic shear strength (127,115÷157,700= 0.8060).

Patents and patent applications disclosed herein are hereby incorporated by reference. Other embodiments of the invention are possible. It is to be understood that the above description is intended to be illustrative, and not restrictive. Many other embodiments will be apparent to those of skill in the art upon reviewing the above description. The scope of the invention should, therefore, be determined with reference to the appended claims along with the full scope of equivalents to which such claims are entitled.

What is claimed is:

1. A slip control article for wet and dry conditions, comprising;
   a backing layer having a first surface with an array of 100 to 10,0000 upstanding stems per square inch, molded at least partially integrally therewith, and a second surface, at least a portion of each upstanding stem be formed from an elastomeric material having a Shore hardness of less than about 90A, each stem having maximum cross sectional dimension of 0.003 to 0.030 inches, and each stem having an aspect ratio of at least 1.25, whereby each stem is highly flexible, the first surface defined by the array of flexible stems having a static coefficient of friction when dry of at least 0.6 and a static coefficient of friction when wet within 20% of the static coefficient of friction when dry, the first surface defined by the array of flexible stems having a dynamic shear strength of at least 16,805 dynes/centimeter$^2$ when engaged with a stem array of another slip control article having the same defined characteristics, and the first surface defined by the array of flexible stems having a peel strength and a tensile strength of substantially zero when engaged with a stem array of another slip control article having the same defined characteristics.

2. The article of claim 1 wherein the static coefficient of friction when dry is at least 1.3.

3. The article of claim 1 wherein the static coefficient of friction when dry is at least 2.0.

4. The article of claim 1 wherein the backing layer comprises an elastomeric material integrally formed with the upstanding stems.

5. The article of claim 1 wherein the backing layer comprises additional layers of at least one of a reinforcing web, a foam layer, a substantially inelastic polymeric layer, or an adhesive layer.

6. The article of claim 1 wherein the backing layer comprises a blend of polyurethane and a polystyrene material with elastomeric segments.

7. The article of claim 1 wherein the backing layer comprises a compound selected from the group consisting of elastomeric materials, polyvinyl, polyurethane, polyester, polyacrylic, polycarbonate, and polyolefin.

8. The article of claim 1 further comprising an array of upstanding stems of an elastomeric material located on the second surface of the backing layer.

9. The article of claim 1 wherein the elastomeric material comprise a elastic block copolymer, styrene isoprene styrene, styrene butadiene styrene, styrene ethylene butadiene styrene, or a blend thereof.

10. A slip control article for wet and dry conditions, comprising:

a backing layer having a first surface with an array of 100 to 10,000 upstanding stems per square inch molded at least partially integrally therewith, and a second surface, at least a portion of each upstanding stem being formed from an elastomeric material having a Shore hardness of less than about 90A, each stem having a maximum cross sectional dimension of 0.003 to 0.030 inches, and each stern having an aspect ratio of at least 1.25, whereby each stem is highly flexible, the first surface defined by the array of flexible stems having a static coefficient of friction when dry of at least 0.6 and a static coefficient of friction when wet within 20% of the static coefficient of friction when dry, the first surface defined by the array of flexible stems having a dynamic shear strength of at least 16,805 dynes/centimeter$^2$ when engaged with a stem array of another slip control article having the same defined characteristics, the first surface defined by the array of flexible stems having a peel strength and a tensile strength of substantially zero when engaged with a stem array of another slip control article having the same defined characteristics, and micro-channels on at least the first surface.

11. The article of claim 10 further comprising an absorbent material in fluid communication with the micro-channels.

12. The article of claim 1 wherein the backing layer includes holes between at least two of the upstanding stems.

13. The article of claim 1 wherein at least a portion of the upstanding stems comprise one of hydrophobic or hydrophilic properties.

14. The article of claim 1 wherein the upstanding stems have a height of about 0.254 mm to about 1.27 mm (0.010 inches to 0.050 inches).

15. The article of claim 1 wherein the tensile modulus of the elastomeric material is less than about 12 MPa.

16. The article of claim 1 wherein the tensile modulus of the elastomeric material is less than about 6 MPa.

17. The article of claim 1 wherein the tensile modulus of the elastomeric material is less than about 4 MPa.

18. The article of claim 1 wherein the shore hardness of the elastomeric material is less than about 70D.

19. The article of claim 1 wherein the shore hardness of the elastomeric material is less than about 60A.

20. The article of claim 1 wherein the aspect ratio is at least 1.5.

21. The article of claim 1 wherein the elongation at yield of the elastomeric material is at least about 30%.

22. An article incorporating the slip control article of claim 1.

23. The article of claim 22 comprising one of a molded article, a sheet article, or a profile extruded article.

24. A slip control article for wet and dry conditions, comprising:

a backing layer having a first surface with an array of 100 to 10,000 upstanding stems per square inch molded at least partially integrally therewith, and a second surface, at least a portion of each upstanding stem being formed from an elastomeric material having a shore hardens of less than about 90A, each stem having a maximum cross sectional dimension of 0.003 to 0.030 inches, and each stem having an aspect ratio of at least 1.25, whereby each stem is highly flexible, and whereby the stems occupy no greater than 24.8% of the total area of the first surface of the backing layer, the first surface defined by the array of flexible stems having a static coefficient of friction when dry of at least 0.6 and a static coefficient of friction when wet within 20% of the static coefficient of friction when dry, the first surface defined by the array of flexible stems having a dynamic shear strength of at least 16,805 dynes/centimeter$^2$ when engaged with a stem array of another slip control article having the same defined characteristics, and the first surface defined by the array of flexible stems having a peel strength and a tensile strength of substantially zero when engaged with a stem array of another slip control article having the same defined characteristics.

25. A slip control article for wet and dry conditions, comprising:

a backing layer having a first surface with an array of at least 1516 upstanding stems per square inch molded at least partially integrally therewith, and a second surface, at least a portion of each stem being formed from an elastomeric material having a shore of less than about 90A, each stem having a maximum cross section dimension of 0.003 to 0.030 inches and having an aspect ratio of at least 1.25 so that each stem is highly flexible and the array of elastomeric stems defines a soft and pleasant feel for skin contact, the surface defined by the array of flexible stems having a static coefficient of friction when dry of at least 0.6 and a static coefficient of friction when wet within 20% of the static coefficient of friction when dry, the first surface defined by the array of flexible stems having a dynamic shear strength of at least 16,805 dynes/centimeter$^2$ when engaged with a stem array of another slip control article having the same defined characteristics, and the first surface defined by the array of flexible stems having a peel strength and a tensile strength of substantially zero when engaged with a stem array of another slip control article having the same defined characteristics.

26. The slip control article of claim 25 wherein at least a portion of each stem is formed from an elastomeric material having a Shore hardness of less than about 65A.

27. The slip control article of claim 1 wherein the array of elastomeric stems defines a soft and pleasant feel for skin contact.

28. The slip control article of claim 1 wherein the array is 150 to 10,000 upstanding stems per square inch.

29. The slip control article of claim 24 wherein the array is 150 to 10,000 upstanding stems per square inch.

30. The slip control article of claim 24 wherein the array of elastomeric stems defines a soft and pleasant feel for skin contact.

31. A slip control article for wet and dry conditions, comprising:

a backing layer having a first surface with an array of 100 to 10,000 upstanding stems per square inch molded at least partially integrally therewith, and a second surface, at least a portion of each upstanding stem being formed from an elastomeric material having a Shore hardness of less than about 90A, each stem having a maximum cross sectional dimension of 0.003 to 0.030 inches, whereby each stem is highly flexible and the array of elastomeric steins defines a soft and pleasant feel for skin contact, the first surface defined by the array of flexible stems having a static coefficient of friction when dry of at least 0.6, the first surface defined by: the array of flexible stems having an average dynamic shear strength of about 80% of its peak dynamic shear strength when engaged with a stem array of another slip control article having the same defined characteristics, and the outer surface defined by, the array of flexible stems having a peel strength and a tensile strength of substantially zero when engaged with a stem array of another slip control article having the same defined characteristics.

32. The slip control article of claim 31 wherein the outer surface defined by the array of flexible stems has an average dynamic shear strength of about 85% of its peak dynamic shear strength when engaged with a stem array of another slip control article having the same defined characteristics.

33. The slip control article of claim 32 wherein the outer surface defined by the array of flexible stems has an average dynamic shear strength of about 90% of its peak dynamic shear strength when engaged with a stem array of another slip control article having the same defined characteristics.

34. A molded grip for wet and dry conditions, the grip comprising:

a backing layer having an outer surface with an array of 100 to 10,000 upstanding stems per square inch molded at least partially integrally therewith, at least a portion of each upstanding stem being formed from an elastomeric material having a Shore hardness of less than about 90A, each stem having a maximum cross sectional dimension of 0.003 to 0.030 inches, whereby each stem is highly flexible and the array of elastomeric stems defines a soft and pleasant feel for skin contact, the outer surface defined by an array of flexible stems having a static coefficient of friction when dry of at least 0.6, the outer surface defined by the array of flexible stems having an average dynamic shear strength of about 80% of its peak dynamic shear strength when engaged with a stem array on an outer surface of another article having the same defined characteristics, and the outer surface defined by the array of flexible stems having a peel strength and a tensile strength of substantially zero when engaged with a stem array of an outer surface of another article having the same defined characteristics.

* * * * *